Figure 1:
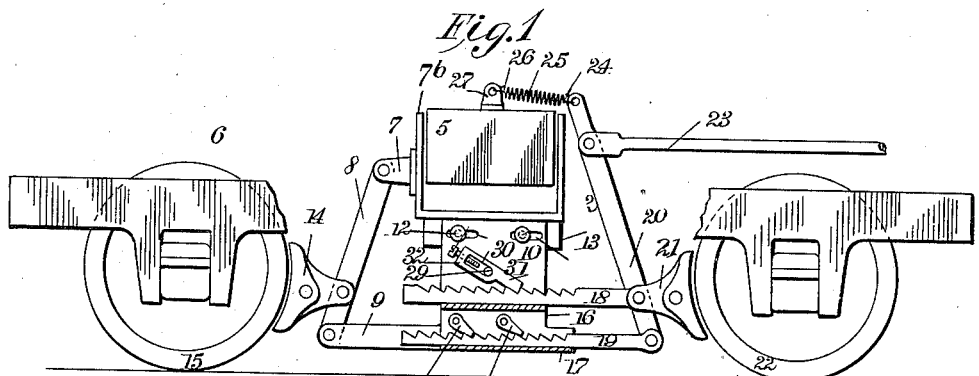

J. S. ASHWORTH.
BRAKE SHOE ADJUSTER.
APPLICATION FILED JUNE 9, 1911.

1,030,150.

Patented June 18, 1912.

2 SHEETS—SHEET 1.

WITNESSES
F. E. Alexander
E. B. Marshall

INVENTOR
James S. Ashworth
BY
ATTORNEYS

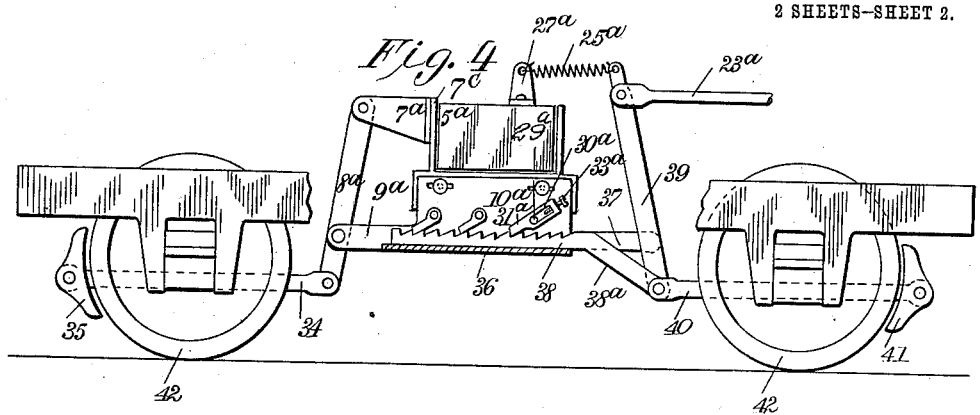
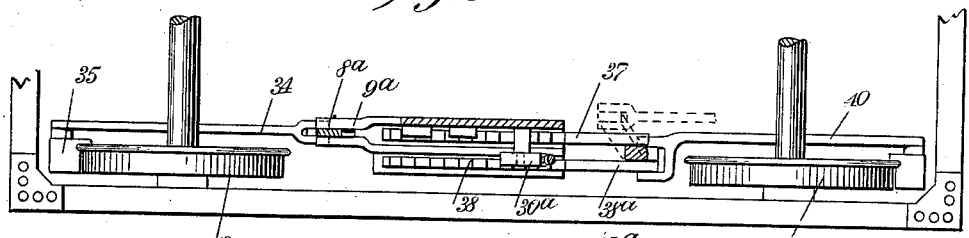
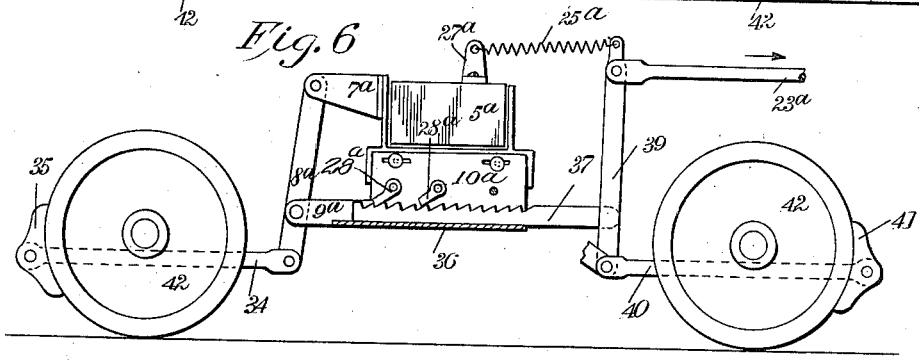
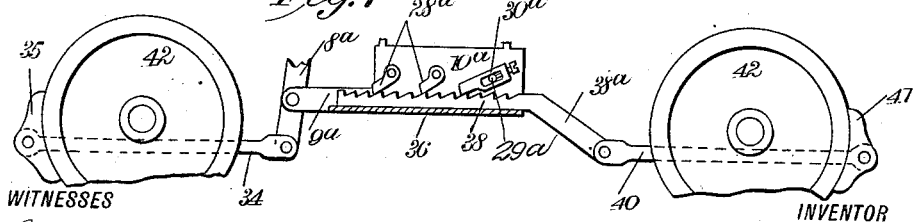

UNITED STATES PATENT OFFICE.

JAMES SAVILLE ASHWORTH, OF CUYAHOGA FALLS, OHIO.

BRAKE-SHOE ADJUSTER.

1,030,150.  Specification of Letters Patent.  Patented June 18, 1912.

Application filed June 9, 1911. Serial No. 632,145.

*To all whom it may concern:*

Be it known that I, JAMES S. ASHWORTH, a citizen of the United States, and a resident of Cuyahoga Falls, in the county of Summit and State of Ohio, have invented a new and Improved Brake-Shoe Adjuster, of which the following is a full, clear, and exact description.

My invention relates to brake shoe adjusters, and it has for its object to provide a simple apparatus which may be used on car trucks either with outside or inside brake shoes for automatically adjusting the position of the brake shoes relatively to the wheels, to take up the slack caused by wear.

Additional objects of the invention will appear in the following complete specification, in which the preferred form of the invention is disclosed.

In the drawings similar characters of reference indicate corresponding parts in all the views, in which—

Figure 2:
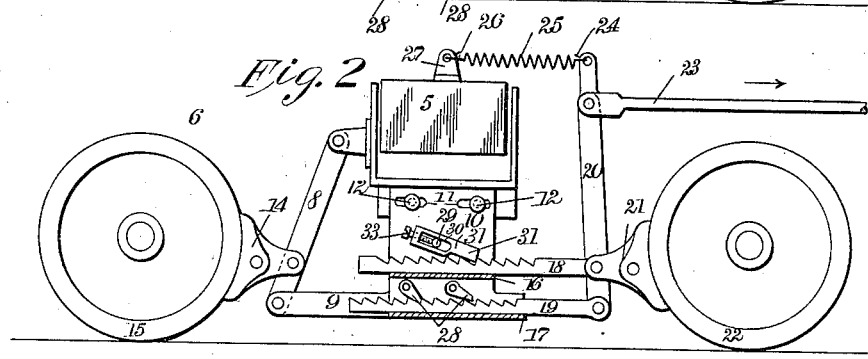
Figure 3:
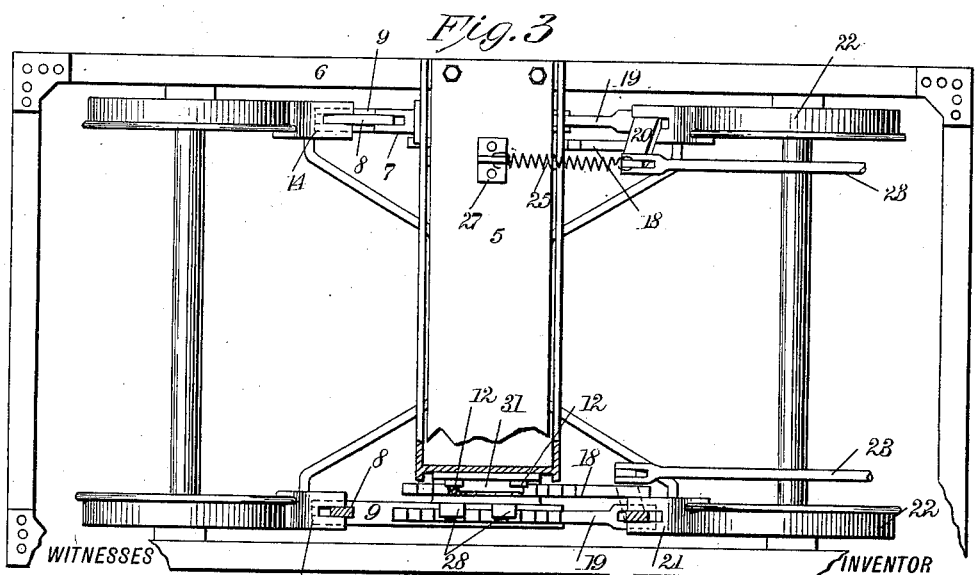

Figure 1 is a side elevation of the truck with parts broken away to show my improvements; Fig. 2 is a view similar to that shown in Fig. 1, but with the brakes applied; Fig. 3 is a plan view of Fig. 1; Fig. 4 is a view similar to that shown in Fig. 1 of the drawings, of a modification with outside brake shoes; Fig. 5 is a fragmentary plan view of Fig 4; and Figs. 6 and 7 are sectional elevations similar to that shown in Fig. 4, but with the brakes applied, and with parts broken away to show the operating members.

By referring to Fig. 1 of the drawings it will be seen that to the member 7ᵇ of the truck 6, there is secured a bracket 7, to which a lever 8 is articulated. To the bottom of the lever 8 there is articulated an arm 9, secured to a member 10, the said member 10 having slots 11, through which are disposed the pins 12, the said pins 12 being secured to a depending plate 13, which, in turn, is secured to the member 7ᵇ. A brake shoe 14 is mounted on the lever 8 between the bracket 7, and the arm 9, the said brake shoe 14 being adapted to engage the periphery of the wheel 15. Horizontal flanges 16 and 17 are secured to the member 10, racks 18 and 19 being disposed for traveling on the said flanges 16 and 17 respectively. These racks 18 and 19 are disposed one above the other, and they are articulated to the lever 20, a brake shoe 21, which is provided for engaging the periphery of the wheel 22, being also mounted on this lever 20, above the rack 19. An operating rod 23 is articulated to the lever 20, above the rack 18, and to the top of the lever 20 there is secured one terminal 24 of the spring 25, the other terminal 26 of the said spring 25 being secured to the bracket 27, which in turn is mounted on the bolster 5. Two pawls 28 are pivoted to the member 10, the said pawls 28 being adapted to engage the teeth of the rack 19.

It will be observed by referring to the drawings, that the pawls 28 are so disposed that one of the pawls will be seated against one of the teeth of the rack 19, while the other pawl 28 is unseated and is disposed between two of the seats of the teeth of the said rack. By means of this construction, only one of the pawls 28 will engage the rack 19, at any one time, and that by moving the rack 19 to the right a distance equal to a half a tooth, the pawl which has engaged the seat of one of the teeth will be raised therefrom, and the other pawl 28 will be seated against one of the teeth.

A pin 29 is secured to the member 10, the said pin 29 being disposed in an elongated slot 30 of the pawl 31, the said pawl 31 being provided for engaging the teeth of the rack 18. The pawl 31 has a threaded orifice 32, in which is disposed the screw 33, the said screw 33 being provided for extending into the slot 30, and limiting the movement of the pin 29 therein.

When the operating rod 23 is drawn to the right, it will carry with it the upper terminal of the lever 20, which draws the brake shoe 21 to the wheel 22, at the same time pushing the rack 19 against one of the pawls 28, which pushes the member 10, and the arm 9, to the left, which carries with it the lever 8, and the brake shoe 14, the brake shoe 14 engaging the periphery of the wheel 15. When the brake shoe 21 is in engagement with the periphery of the back wheel 22, it will be observed that the rack 18 has been drawn to the right, and since the member 10 has been moved to the left by the rack 19, and one of the pawls 28, the pawl 31 and the rack 18 have been moved relatively to each other. When there is a certain amount of slack in the device the pawl 31 is moved far enough relatively to the rack 18 to pass one of the teeth on the said rack, the slot 30 of the said pawl 31 permitting the said pawl 31 to seat itself against the next tooth. When the power used to move the operating rod 23 to the right is removed, the spring 25 draws the upper terminal of the lever 20 to the left, which moves the rack 19 far enough to the right to permit the pawl 28 which has been disposed between the seats of two of the teeth, to completely pass the top of one of the teeth and to seat against its side, while the pawl 28, which has engaged the seat of one of the teeth, is raised therefrom, and is moved to the left relatively thereto. In this way the adjustment takes place, the amount of clearance the brake shoes will have relatively to the car wheels 22 being regulated by the position of the screws 33 in the slots 30 of the pawls 31. This is so because the pawls 31 will move to the right with the rack 18, and the distance of their travel with the rack 18, before the rack 18 may be moved relatively to the pawls 31, is determined by the distance of travel of the pins 29 in the slots 30.

The constructions shown in Figs. 4, 5, 6 and 7 of the drawings closely resemble the constructions shown in Figs. 1, 2 and 3 of the drawings, the only difference being those which are made necessary by the fact that in the constructions shown in Figs. 4, 5, 6 and 7 of the drawings the brake shoes are hung at the outer sides of the car wheels.

By referring to Fig. 4 of the drawings it will be seen that to the member 7ᶜ the bracket 7ᵃ is secured, a lever 8ᵃ being pivoted to the said bracket. Mounted on the said lever 8ᵃ there is an arm 34, which carries a brake shoe 35. An arm 9ᵃ is provided, which is secured to the member 10ᵃ, the said arm 9ᵃ being articulated to the lever 8ᵃ, between the brackets 7ᵃ and the arm 34. The said member 10ᵃ is movable relatively to the bolster 5ᵃ. Disposed on the flanges 36 there are two racks 37 and 38, the said rack 38 having a terminal 38ᵃ which is bent downwardly and which is articulated to the lower terminal of the lever 39, the rack 37 being articulated to the said lever 39, at a distance from its lower terminal. An arm 40 is mounted on the lever 39, and carries the brake shoe 41, which is disposed against the outer side of one of the wheels 42. The operating rod 23ᵃ resembles the operating rod 23, shown in Fig. 1 of the drawings, and the spring 25ᵃ with the bracket 27ᵃ corresponds with the spring 25 and the bracket 27 shown in Fig. 1 of the drawings. The teeth of the rack 37 are engaged by two pawls 28ᵃ which are pivoted to the member 10ᵃ. These pawls 28ᵃ are so disposed relatively to the teeth of the rack 37 that one of the pawls is seated against one of the teeth of the rack 37, while the other pawl 28ᵃ is spaced between two of the seats on the said teeth. A pin 29ᵃ is secured to the member 10ᵃ, the said pin 29ᵃ being disposed in the slot 30ᵃ of the pawl 31ᵃ, the said pawl 31ᵃ engaging the teeth of the rack 38. A screw 33ᵃ, which corresponds with the screw 33, shown in Fig. 1 of the drawings, serves the same purpose as the said screw 33, to limit the movement of the pin 29ᵃ in the slot 30ᵃ.

In the operation of the modified form of the invention shown in Figs. 4, 5, 6 and 7 of the drawings, when the upper terminal of the lever 39 is drawn to the right by the operating rod 23ᵃ, and against the tension of the spring 25ᵃ, the arm 40 is drawn to the left, carrying with it the brake shoe 41, which is by this means brought into engagement with the periphery of one of the car wheels 42. The lever 39 when moving to the right carries with it the rack 37, and as the teeth of the rack 37 are engaged by one of the pawls 28ᵃ, the member 10ᵃ is moved to the right, carrying with it the arm 9ᵃ, the lever 8ᵃ, the arm 34, and the brake shoe 35. In this manner both of the brake shoes are brought into engagement with the peripheries of the wheels. In other respects the operation of the modified form of the invention shown in Figs. 4, 5, 6 and 7 corresponds with the operation of the device shown in Figs. 1, 2 and 3 of the drawings.

It should be understood that the device disclosed in this application may be operated with air or hand brakes, or both, and, in fact, with all brakes in common use on electric railway cars, steam railways, passenger and freight cars, and all similar vehicles, using brakes.

Having thus described my invention, I claim as new, and desire to secure by Letters Patent—

1. In a brake shoe adjuster, a support, a member movable relatively to the support, a lever pivoted at one end to the support, means connecting the member and the other end of the lever, a brake shoe mounted on the lever between the support and the said means, a rack, a pawl on the member for engaging the rack and preventing the movement of the rack in the direction of the brake shoe, an operating lever pivoted at one end to the rack, and a second brake shoe mounted on the operating lever.

2. In a brake shoe adjuster, a support, a member movable relatively to the support, a lever pivoted to the support, means connecting the member and the lever, a brake shoe mounted on the lever, two racks spaced apart, pawls mounted on the member and engaging the racks, a lever articulated to the racks, and a brake shoe mounted on the last-mentioned lever.

3. In a brake shoe adjuster, a support, a member movable relatively to the support, a lever pivoted at one end to the support, means connecting the member and the other end of the lever, a brake shoe mounted on the lever between the support and the said means, a rack, a pawl on the member for engaging the rack and preventing the movement of the rack in the direction of the brake shoe, an operating lever pivoted at one end to the rack, a second brake shoe mounted on the operating lever, and a spring connecting the operating lever with the support.

4. In a brake shoe adjuster, a support, a member movable relatively to the support, a lever pivoted to the support, means connecting the member and the lever, a brake shoe mounted on the lever, a rack, a pawl on the member for engaging the rack, an operating lever pivoted to the rack, and a second brake shoe mounted on the operating lever.

5. In a brake shoe adjuster, a support, a member movable relatively to the support, a lever pivoted to the support, means connecting the member and the lever, a brake shoe mounted on the lever, a rack, a pin secured to the member, a pawl for engaging the rack and having a slot in which the pin is disposed and a threaded orifice extending to the slot, a screw in the threaded orifice for limiting the movement of the pin in the slot, an operating lever pivoted to the rack, and a second brake shoe mounted on the operating lever.

6. In a brake shoe adjuster a support, a member having flanges, pin and slot connections between the support and the member, a lever pivoted to the support, means connecting the member and the lever, a brake shoe mounted on the lever, two racks mounted on the flanges, pawls mounted on the member, and engaging the racks, a lever articulated to the racks, and a brake shoe mounted on the lever.

7. In a brake shoe adjuster, a support, a member having flanges, pin and slot connections between the support and the member, a lever pivoted to the support, means connecting the member and the lever, a brake shoe mounted on the lever, two racks mounted on the flanges, pawls mounted on the member and engaging the racks, a lever articulated to the racks, a brake shoe mounted on the lever, and a spring connecting the support and one of the levers.

8. In a brake shoe adjuster, a support, a member movable relatively to the support, a lever pivoted to the support, means connecting the member and the lever, a brake shoe mounted on the lever, two racks, two pawls mounted on the member and engaging one of the racks, one of the pawls being seated against one of the teeth of one of the last-mentioned racks when the other pawl is spaced from the seats in the teeth, another pawl mounted on the member and engaging the other rack, a lever articulated to the brake, and a brake shoe mounted on the last-mentioned lever.

9. In a brake shoe adjuster, a support, a member movable relatively to the support, a lever pivoted to the support, means connecting the member and the lever, a brake shoe mounted on the lever, two racks, two pawls mounted on the member and engaging one of the racks, one of the pawls being seated against one of the teeth of one of the last-mentioned racks when the other pawl is spaced from the seats in the teeth, another pawl having a slot and engaging the other rack, a pin secured to the member and disposed in the slot, there being an orifice in the pawl, extending to the slot, a member movable in the orifice for regulating the length of the slot, a lever articulated to the racks, and a brake shoe mounted on the last-mentioned lever.

10. In a brake shoe adjuster, a support, a lever pivoted to the support, a brake shoe, means connecting the brake shoe with the lever, a member movable relatively to the support, and secured to the lever, two racks having terminals spaced apart, pawls on the member for engaging the racks, a second lever to which the terminals of the racks are secured, a second brake shoe, and means connecting the second brake shoe with the last-mentioned lever.

In testimony whereof I have signed my name to this specification in the presence of two subscribing witnesses.

JAMES SAVILLE ASHWORTH.

Witnesses:
Edward Jos. McDade,
Thomas Ashworth.